March 25, 1952 — O. L. CALLAHAN — 2,590,679
SAFETY VALVE
Filed Oct. 10, 1946
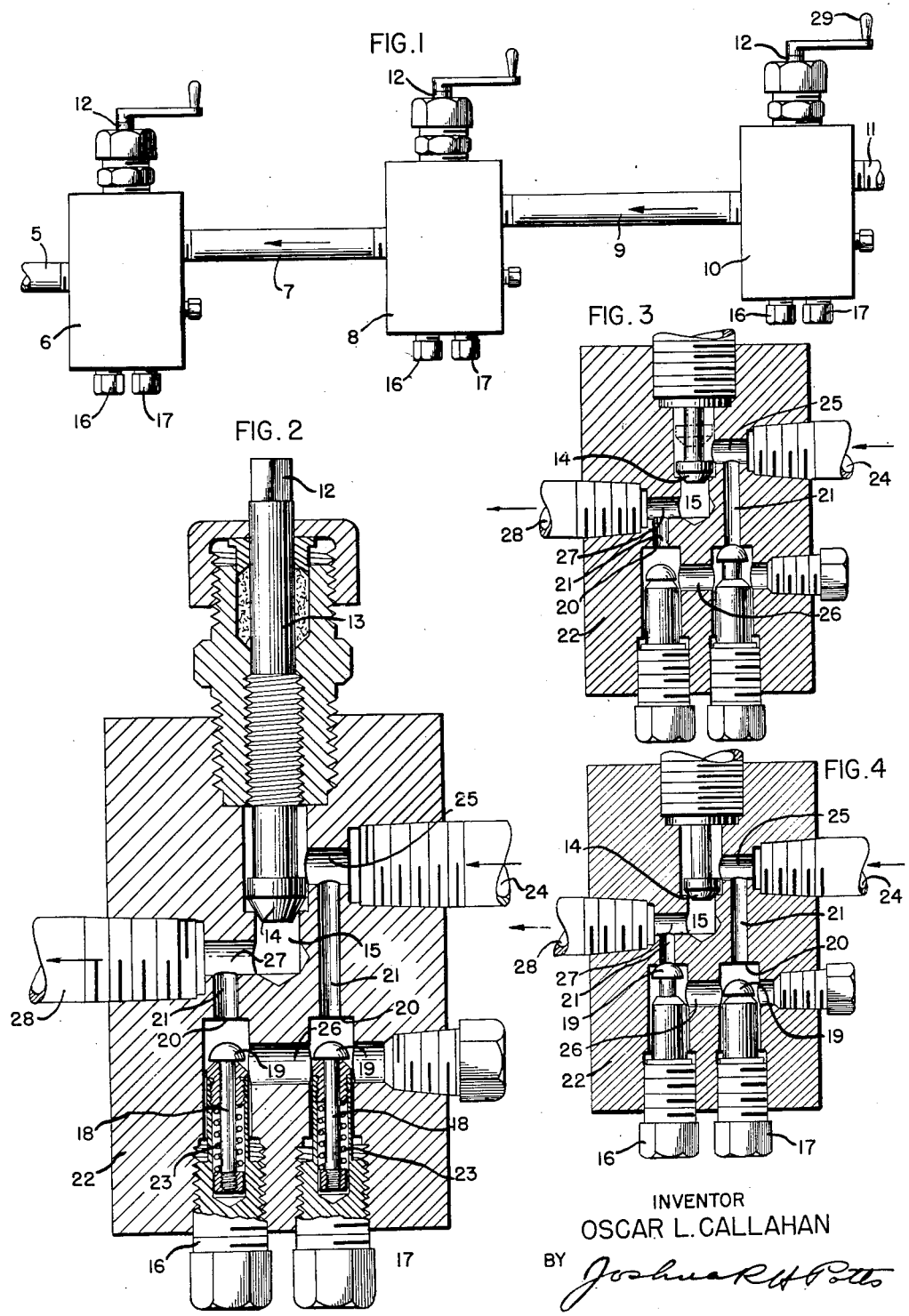
INVENTOR
OSCAR L. CALLAHAN
BY Joshua R H Potts
HIS ATTORNEY Patented Mar. 25, 1952

2,590,679

UNITED STATES PATENT OFFICE 2,590,679

SAFETY VALVE

Oscar L. Callahan, West Frankfort, Ill.

Application October 10, 1946, Serial No. 702,593

2 Claims. (Cl. 137—153)

My invention relates to safety-line valves. More particularly, my invention relates to the provision of valves which will prevent reduction of pressure in the event of a break in the line.

According to the principle of my invention, I have provided an inlet and an outlet, and a pair of automatic valves. The inlet has a bore communicating with one valve, and the outlet has a bore communicating with the other valve; and the valves have a bore enabling them to communicate with each other.

Normally, the air will pass through the inlet, through the inlet bore, and then through the bore between the valves, through the outlet bore, and then through the outlet.

According to the principle of my invention, for example, if there should be a break ahead of one of the blocks, the automatic valve nearer the break would close, holding the pressure behind, and the valve would remain closed until the line had been repaired.

After the line is repaired, the pressure from the compressor will open the valve automatically again, and the air will pass freely through the valve. In the event of a break in the line between two valve blocks, the nearest automatic valves will close, keeping the pressure properly behind one and ahead of the other.

After the line has been repaired, a hand-controlled by-pass valve is opened and the pressure is equalized. Then the automatic valves return to normal position. Thereafter, the hand-controlled valve is closed in normal position, and the air will again have free passage.

These and other objects and advantages will appear and be brought out more fully in the following specification, reference being had to the accompanying drawings, in which:

Fig. 1 shows a diagrammatic view of the safety line and valve.

Fig. 2 is a vertical section, showing the valve in normal position.

Fig. 3 is a vertical section, showing the action of the valve when the line is broken to the left of the valve, viewed in Fig. 3.

Fig. 4 is a vertical section showing the action of the valve when the line is broken to the right of the valve, looking at Fig. 4.

Referring to the drawings in detail, in which I have shown the preferred form for the purpose of illustrating the principle of my invention, I have shown, in Fig. 1, a safety air-line valve showing a first section of line 5, a valve 6; a second section of line 7 and a second valve 8; a third section of line 9 and a third valve 10; and a fourth section of line 11.

The structure of the valves 6, 8 and 10 is similar in all cases, and is shown in vertical section in Fig. 2.

As shown in this view, there is a hand-operated screw-type valve 12, having a stem 13, and having a seat 14 which is adapted to close an aperture 15.

Also shown, are automatic valves 16 and 17. These valves are provided with stems 18, having seats 19 which are adapted to close apertures 20 in bores 21 in the valve block 22.

These stems are provided with springs 23, suitably housed to keep the valve normally open when no excessive pressure drop occurs across the valve.

Under normal conditions, air is allowed to pass freely through the valves. For example, the air under normal conditions will pass into the intake 24, as clearly shown in Fig. 2, to the bore 25, into the bore 21, to the bore 26 to the second bore 21 to the bore 27, and thence into the outlet 28.

In case the line should break to the right of valve 10, as viewed in Fig. 1, the automatic valve 17 closes to hold the pressure, as clearly shown in Fig. 3, the valve closing against the pressure of the spring and the reduction of air pressure.

The valve 17 remains closed until the line has been repaired. By this arrangement and operation, the structure secures against any possibility of reduction of pressure.

After the broken line has been repaired, the hand-controlled bypass valve 14 is opened and the pressures at the inlet and outlet are equalized so that the automatic valve 17 in valve 8 and the automatic valve 16 in valve 10 will return to an open position under the influence of the springs 23.

In case the break is between valves 8 and 10, the automatic valve 16 in 10 will close, as also will the valve stem 18. Thereby, the pressure is kept ahead of valve 8 and behind valve 10.

After the line has been repaired, the hand control by-pass valve 29 is opened, and the pressure is equalized, and then the automatic valve 17 in valve 8 and valve 16 in valve 10 go back to normal position.

The next step is to close the hand-controlled by-pass valve 29 in its normal position, and then air again will have free passage throughout the system. It should be understood that each of these valves 6, 8 and 10 is a combination unit, including two automatic valves and a hand-controlled by-pass valve.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In combination, a conduit adapted to receive and conduct fluid under pressure, and mechanism included in said conduit for segregating accidental breaks at either side of said mechanism, said mechanism comprising a body member formed with an inlet and an outlet in communication with said conduit, said body member also being formed with a passage connected directly to said inlet, a second passage connected directly to said outlet and a bore connecting said passages, a valve in each of said passages, spring means operatively associated with each valve for normally biasing that valve to an open position, each of said valves being adapted to be moved into a closed position upon an excessive drop in pressure across said inlet and outlet, said body member being formed with a bypass connecting said inlet and outlet, and a manually operable valve adapted to close said bypass.

2. In combination, a conduit adapted to receive and conduct fluid under pressure, and mechanism included in said conduit for segregating accidental breaks at either side of said mechanism, said mechanism comprising a body member having an inlet and an outlet in communication with said conduit, said body member being formed with a pair of valve chambers, a bore connecting said valve chambers and a pair of passages, one passage connecting one valve chamber to said inlet and the other passage connecting the other of said valve chambers to said outlet, a valve assembly in each of said chambers, each of said valve assemblies including a valve member adapted to close the passage associated therewith, spring means for normally biasing that valve member into open position, each of said valve members being adapted to be moved into closed position by an excessive drop in pressure across said inlet and outlet, said body being formed with a bypass directly connecting said inlet and outlet, said bypass including a valve seat, and a valve member operatively mounted in said body and adapted to cooperate with said seat to close said bypass.

OSCAR L. CALLAHAN.

REFERENCES CITED

The following references are of record in the file of this patent:

UNITED STATES PATENTS

| Number | Name | Date |
| --- | --- | --- |
| 735,544 | Mann | Aug. 4, 1903 |
| 2,174,961 | Bennett | Oct. 3, 1939 |
| 2,205,150 | Newberry | June 18, 1940 |
| 2,306,012 | Campbell | Dec. 22, 1942 |

FOREIGN PATENTS

| Number | Country | Date |
| --- | --- | --- |
| 7,098 | Great Britain | Apr. 4, 1899 |
| 47,215 | France | Nov. 25, 1936 |